__United States Patent Office__

3,403,141
Patented Sept. 24, 1968

3,403,141
POLYMERIZATION OF 1,3-BUTADIENE
Robert P. Zelinski and Floyd E. Naylor, Bartlesville, Okla., assignors to Phillips Petroleum Company, a corporation of Delaware
No Drawing. Filed Sept. 28, 1964, Ser. No. 399,863
15 Claims. (Cl. 260—94.3)

ABSTRACT OF THE DISCLOSURE

High cis-polybutadiene having a relatively low Mooney value and a reduced tendency to cold flow is produced by using a catalyst system formed by mixing (1) the reaction product of an organoaluminum compound, organoaluminum hydride, or lithium aluminum hydride with either butadiene or isoprene and (2) one or more components containing titanium and iodine.

---

This invention relates to a method of polymerizing 1,3-butadiene to form a rubbery polymer. In another aspect it relates to an improved catalyst system which can be used to polymerize 1,3-butadiene to form a polymer having improved processing and handling characteristics.

Polybutadiene in which at least 85 percent of the monomer units are joined by cis-1,4-addition exhibits outstanding physical characteristics which make it very valuable for use in treadstocks for automobile and truck tires. Although this polymer has achieved high commercial success in recent years, there have been a number of problems connected with its processing and handling. In order to compound readily on a roll mill or in a Banbury mixer, the polymer should have a Mooney value of less than 100, preferably in the range of about 15 to 60 (ML–4 at 212° F.). Cis-polybutadiene having such a Mooney value, however, normally has a tendency to flow in the uncured state, making it difficult to store and transport. Considerable effort has been expended to produce a cis-polybutadiene which has a relatively low Mooney value and which also has very little tendency to cold flow.

High cis-polybutadiene can be made using a catalyst system which is formed by mixing an organoaluminum compound such as a trialkylaluminum or a dialkylaluminum hydride with additional catalyst component or components containing titanium and iodine such as titanium tetraiodide, titanium tetrachloride and titanium tetraiodide or titanium tetrachloride and elemental iodine.

It has now been discovered that high cis-polybutadiene can be prepared with a relatively low Mooney value and reduced tendency to cold flow by using a catalyst system formed by mixing (1) the reaction product of an organoaluminum compound, organoaluminum hydride or lithium aluminum hydride with either butadiene or isoprene and (2) one or more components containing titanium and iodine. This catalyst system can be used to polymerize butadiene to obtain a polymer which has at least 85 percent cis-1,4-structure and low cold flow.

It is an object of this invention to provide an improved method for polymerizing butadiene to form a high cis-polymer.

Another object is to provide an improved catalyst system which can be used to polymerize butadiene to form a polymer having improved physical characteristics.

Another object is to provide a method of making high cis-polybutadiene which has a Mooney value rendering it readily processable but with very little tendency to cold flow in the uncured state.

Other objects, advantages and features of this invention will be apparent to those skilled in the art in the following discussion.

The catalyst system of this invention is prepared by first reacting together butadiene or isoprene with an aluminum compound which can be either an organoaluminum, organoaluminum hydride or lithium aluminum hydride. For convenience, this catalyst component is hereinafter referred to as the "reaction product." The organoaluminum compound can be represented by the formula $R_nAlH_m$ where $n$ is an integer of 1 to 3 and $m$ is an integer of 0 to 2, the sum of $n$ plus $m$ equals 3, and R is a saturated aliphatic, saturated cycloaliphatic, or aromatic radical containing from 1 to 20 carbon atoms. Examples of these organoaluminum and organoaluminum hydride compounds include trimethylaluminum, triisobutylaluminum, trioctylaluminum, tridodecylaluminum, trieicosylaluminum, methyldiethylaluminum, tricyclobutylaluminum, tricyclohexylaluminum, triphenylaluminum, dimethylaluminum hydride, diethylaluminum hydride, isobutylaluminum dihydride, phenylaluminum dihydride, dicyclohexylaluminum hydride, and the like.

The reaction of the butadiene or isoprene with the aluminum compound is preferably carried out in the presence of a hydrocarbon diluent with an excess of the conjugated diene. The quantity of conjugated diene is generally in the range of about 2 to 20 moles per mole of the aluminum compound. While the reaction can be carried out in the liquid monomer, for better control it is preferred that an inert diluent be used which is not deleterious to the catalyst system. Suitable diluents include aromatic, paraffinic and cycloparaffinic hydrocarbons having about 4 to 10 carbon atoms per molecule, such as benzene, toluene, n-butane, isobutane, n-pentane, isooctane, n-dodecane, cyclopentane, cyclohexane, methylcyclohexane, and the like. This reaction is preferably carried out at a temperature in the range of 50 to 200° C. and at a pressure sufficient to maintain the reaction mixture in the liquid phase. The time for the reaction depends upon the temperature used but normally is in the range of about 15 minutes to 200 hours. It is important that sufficient time be allowed for the reaction to proceed substantially to completion since merely the contacting of the aluminum compound with butadiene as the initial step in the catalyst charging procedure is not sufficient to produce the results of the present invention. In other words, the reaction of the butadiene or isoprene with the aluminum compound must be carried out as a distinct and separate initial step prior to the catalyst charging procedure for the butadiene polymerization.

Butadiene is then polymerized in a hydrocarbon diluent such as that described above by contacting butadiene with a catalyst formed by mixing (1) the reaction product of the aluminum compound and butadiene or isoprene and (2) a second component which contains titanium and iodine. The second component can include one or more compounds of constituents which supply the titanium and iodine. This can be a single compound, i.e. titanium tetraiodide, or two compounds such as titanium tetrachloride and titanium tetraiodide. The second component can include a titanium halide which has the formula $TiX_a$, where X is a chlorine or bromine and $a$ is an integer of 2 to 4, plus an iodine constituent such as elemental iodine, an inorganic iodide such as hydrogen iodide, iodine halide such as iodine monochloride, lithium iodide and aluminum iodide, an iodohydrocarbon, and an organoaluminum iodide having the formula $R_xAl_yI_z$, where R is as previously defined, $x$ and $z$ are each integers of 1 to 3 and $y$ is an integer of 1 or 2 with the sum of $x$ plus $z$ equal to 3 times $y$, the latter particularly with the tetrachloride or bromide of titanium. Examples of organoaluminum iodides include methylaluminum diiodide, n-pentylaluminum diiodide, tetradecylaluminum diiodide, 1-naphthylaluminum diiodide, diethylaluminum iodide, methylethylaluminum iodide, diisobutylaluminum iodide, isobutylaluminum sesquiiodide, and the like. Examples of iodohydrocarbons include 1,4-diiodo-2-butene, 1,4-diiodo-2-methyl-2-butene, 1,4-diiodo-2,3-dimethyl-2-butene, and 1,4-diiodo-2-pentene.

In the polymerization catalyst, the ratio of gram atoms of aluminum in the reaction product to the total titanium in the catalyst system is in the range of 3:1 to 30:1 and preferably in the range of 3:1 to 15:1. The mole ratio of titanium compound to the iodine constituent is usually in the range of 0.20:1 to 10:1. The catalyst level can vary over a broad range and is ordinarily in the range of 1 to 20 gram millimoles of the reaction product per 100 grams of 1,3-butadiene to be polymerized. The catalyst level can be adjusted to provide a desired molecular weight or Mooney value in the finished product. The Mooney value can also be controlled by adjusting the iodine level. Other conditions being constant, an increase in iodine level produces an increase in the Mooney viscosity of the polymer. For a given desired Mooney viscosity, the present invention provides polymer having a cold flow which is substantially less than that which would be obtained using a catalyst system of the prior art.

The polymerization temperature can vary broadly from about −100 to 250° F. with the temperature preferably in the range of −30 to 160° F. The pressure depends upon the diluent used and the temperature of the polymerization and is normally that sufficient to maintain the reaction mixture substantially in the liquid phase, although higher pressures can be used if desired. Materials such as carbon dioxide, oxygen or water, which are detrimental to the catalyst, should be avoided.

Any suitable charging procedure can be used for the polymerization in carrying out the process of this invention. For example, in a batch process, the catalyst components can be charged to the reactor containing the butadiene and diluent. Individual catalyst components can be added to the reactor in any order or they can be premixed prior to introducing them into the reactor. In a continuous operation the catalyst components can be mixed together in a separate catalyst preparation vessel. A separate vessel can be used to prepare the first component, i.e., the reaction product of aluminum compound with butadiene or isoprene, after which the additional catalyst components can be added or the reaction product can be charged directly to the reactor containing monomer and diluent and the second catalyst components can then be added.

In order to illustrate further the advantages of this invention, the following examples are presented. In these examples the materials, proportions, and conditions are typical only and should not be construed to limit the invention unduly.

Example I

A reaction product was prepared by reacting 1,3-butadiene and triisobutylaluminum in cyclohexane. The following recipe was used:

| | |
|---|---|
| 1,3-butadiene (1850 mmoles), parts by weight | 100 |
| Cyclohexane, parts by weight | 780 |
| Triisobutylaluminum, millimoles | 184 |

The reactants were heated at 140–160° C. for two hours and the reaction was carried out in an atmosphere of nitrogen.

Butadiene was polymerized in a series of runs using a catalyst formed on mixing the above reaction product with iodine and titanium tetrachloride. Different charging procedures were used as hereinafter noted. Aliquots of the butadiene-triisobutylaluminum reaction product were employed, the amount utilized being based on the aluminum charged. A series of control runs was made using as catalyst components triisobutylaluminum, iodine, and titanium tetrachloride. The recipes were as follows:

| | Invention | Control |
|---|---|---|
| 1,3-butadiene, parts by weight | 100 | 100 |
| Toluene, parts by weight | 1,000 | 1,000 |
| Reaction product, mmoles | Variable | |
| Triisobutylaluminum (TBA), mmoles | | Variable |
| Iodine, mmoles | Variable | 0.9 |
| Titanium tetrachloride (TTC), mmoles | 0.45 | 0.45 |
| Temperature, °F | 41 | 41 |
| Time, hours [1] | 2 | 2 |

[1] Time from initiation of polymerization to addition of shortstop.

Data presented in Table I show the amounts of materials charged, conversion, Mooney (ML–4 at 212° F.), and cold flow. In the table headings, "mhm." is millimoles per 100 grams monomer. In all runs, toluene was charged first after which the reactor was purged with nitrogen.

In Runs 1 through 11, using charging procedure A, butadiene was then charged followed by the organometal component, i.e. the reaction product or triisobutylaluminum and then iodine and titanium tetrachloride, in the order named. In Runs 12 through 16, using charging procedure B, the order of charging was butadiene, iodine, organometal component, and titanium tetrachloride. In Runs 17 through 22, using charging procedure C, the organometal component was charged after the reactor was purged with nitrogen, iodine was added, then titanium tetrachloride, and finally the butadiene.

The temperature was adjusted to 41° F. and maintained at this level throughout the reaction period. After polymerization had continued for two hours, the reactions were shortstopped with a 10 weight percent solution of 2,2′-methylene-bis(4-methyl-6-tert-butylphenol) in a mixture of equal parts by weight of isopropyl alcohol and toluene. The products were recovered by isopropyl alcohol coagulation and dried in a vacuum oven at 140° F. The polymer from Run 15 was gel free, had an inherent viscosity of 2.63, and cis, trans, and vinyl contents of 95.5, 1.6, and 2.9, respectively. All other products had a high cis content. Data are presented in Table I.

TABLE I

| Run No. | Charging procedure | TBA, mhg. | Reaction product, g. atoms Al [1] | I₂, mhm. | Al/Ti mole ratio | Ti/I₂ mole ratio | Conversion, percent | ML–4 at 212° F. | Cold flow, mg./min. |
|---|---|---|---|---|---|---|---|---|---|
| 1 | A | | 2.6 | 0.9 | 5.8/1 | 0.5/1 | 80 | 76 | 0 |
| 2 | A | | 2.8 | 0.9 | 6.2/1 | 0.5/1 | 84 | 98 | 0 |
| 3 | A | | 3.0 | 0.9 | 6.7/1 | 6.3/1 | 80 | 121 | 0.4 |
| 4 | A | | 3.2 | 0.9 | 7.1/1 | 0.5/1 | 83 | 94 | 0.8 |
| 5 | A | | 3.4 | 0.9 | 7.5/1 | 0.5/1 | 80 | 72 | 1.2 |
| 6 | A | | 3.6 | 0.9 | 8/1 | 0.5/1 | 81 | 70 | 1.4 |
| 7 | A | 1.8 | | 0.9 | 4/1 | 0.5/1 | 87 | 130 | 1.8 |
| 8 | A | 2.0 | | 0.9 | 4.4/1 | 0.5/1 | 91 | 43 | 5.9 |
| 9 | A | 2.2 | | 0.9 | 4.9/1 | 0.5/1 | 84 | 25 | 21 |
| 10 | A | 2.4 | | 0.9 | 5.3/1 | 0.5/1 | 75 | 21 | 35 |
| 11 | A | 2.6 | | 0.9 | 5.8/1 | 0.5/1 | 66 | 17 | 51 |
| 12 | B | | 3.0 | 0.5 | 6.7/1 | 0.9/1 | 48 | 34 | 2.1 |
| 13 | B | | 3.0 | 0.7 | 6.7/1 | 0.6/1 | 69 | 79 | 1.0 |
| 14 | B | | 3.6 | 0.5 | 8/1 | 0.9/1 | 42 | 16 | 4.0 |
| 15 | B | | 3.6 | 0.7 | 8/1 | 0.6/1 | 74 | 48 | 1.9 |
| 16 | B | | 3.6 | 0.9 | 8/1 | 0.5/1 | 73 | 113 | 0.5 |
| 17 | C | | 2.6 | 0.9 | 5.8/1 | 0.5/1 | 51 | 58 | 1.6 |
| 18 | C | | 2.8 | 0.9 | 6.2/1 | 0.5/1 | 56 | 49 | 1.2 |
| 19 | C | | 3.0 | 0.9 | 6.7/1 | 0.5/1 | 61 | 37 | 2.0 |
| 20 | C | | 3.4 | 0.9 | 7.5/1 | 0.5/1 | 62 | 29 | 2.5 |
| 21 | C | | 3.6 | 0.9 | 8/1 | 0.5/1 | 61 | 27 | 2.7 |
| 22 | C | 2.6 | | 0.9 | 5.8/1 | 0.5/1 | 92 | 46 | 9.4 |

[1] Based on the R₃Al component charged when preparing the reaction product.

As shown by the above data, the only control run having a product with a satisfactory cold flow value was Run 7. The data show that products from Runs 3 and 16 had lower Mooney values than Control Run 7 but their cold flow was considerably lower than the control. The 34 Mooney product in Run 12 had a lower cold flow than the product in Control Run 8. Still more striking is the fact that the 16 Mooney polymer from Run 14 had a lower cold flow than the 43 Mooney product in Control Run 8. Products from Run 14 and Control Run 11 have similar Mooney values but the cold flow is 4 mg./min. in Run 14 and 51 mg./min. in the control run. Control Run 22 had a cold flow of 9.4 mg./min. whereas the cold flow of the lower Mooney products from Runs 19, 20 and 21 was much less. It can thus be seen that lower Mooney polymers with lower cold flow can be prepared by the process of this invention than can be obtained when operating with a triisobutylaluminum-iodine-titanium tetrachloride catalyst.

Example II

Butadiene was polymerized in a series of runs using reaction product of triisobutylaluminum and butadiene, as described in Example I, as the organometal component in the catalyst system. The recipe was as follows:

| | |
|---|---|
| 1,3-butadiene, parts by weight | 100 |
| Toluene, parts by weight | 1000 |
| Reaction product, mhm | Variable |
| Titanium tetrachloride, mhm | 0.25 |
| Titanium tetraiodide, mhm | 0.25 |
| Temperature, °F. | 41 |
| Time, hours | 2 |

In each of the runs toluene was charged first after which the reactor was purged with nitrogen. Butadiene was added followed by the reaction product. A mixture of the titanium halides was charged last. Polymers were recovered as in Example I. All had a high cis content. Data on Mooney viscosity and cold flow of the products are presented in Table II.

TABLE II

| Run No. | Reaction product, g. atoms Al [1] | Al/Ti mole ratio | Conversion, percent | ML-4 at 212° F. | Cold flow, mg./min. |
|---|---|---|---|---|---|
| 1 | 2.6 | 5.2/1 | 90 | 79 | 1.6 |
| 2 | 2.8 | 5.6/1 | 90 | 77 | 1.9 |
| 3 | 3.0 | 6/1 | 88 | 57 | 2.5 |
| 4 | 3.2 | 6.4/1 | 88 | 56 | 3.0 |
| 5 | 3.4 | 6.8/1 | 88 | 50 | 3.3 |
| 6 | 3.6 | 7.2/1 | 89 | 47 | 4.1 |

[1] Based on the R₃Al component charged when preparing the reaction product.

A control run was made using 2.0 millimoles of triisobutylaluminum and 0.2 millimole each of titanium tetrachloride and titanium tetraiodide. A conversion of 56 percent was reached in 2.2 hours. The polymer had a Mooney value (ML-4 at 212° F.) of 44 and a cold flow of 7.2 mg./min., a considerably higher value than the polymer from Run 6, which had only a slightly higher Mooney and a cold flow of 4.1 mg./min.

Example III

The polymerization procedure of Example I, Run 18, was repeated to obtain a polybutadiene having a cold flow of 2.6 milligrams per minute, a Mooney value (ML-4) of 46 and an inherent viscosity of 2.68. This polymer had a cis content of 95.5 percent as determined by difference, a trans content of 1.6 percent and a vinyl content of 2.9 percent. This polymer was evaluated in a standard tread stock recipe and was found to process essentially the same and exhibit physical properties in stress-strain hardness and heat build-up equivalent to a high cis-polybutadiene having a Mooney value of 43 and prepared with a catalyst of triisobutylaluminum, titanium tetrachloride and iodine. It was thus demonstrated that the present invention provides a high cis-polybutadiene siutable in all respects for the uses to which cis-polybutadiene is normally applied with the additional advantage that the polymer of the invention has low cold flow in the uncured state.

Example IV

In order to demonstrate the invention with the reaction product of diisobutylaluminum hydride with isoprene, the following recipe was used to prepare the organometal component for the catalyst system:

| | |
|---|---|
| Isoprene (MBD), parts by weight | 100 |
| Toluene, parts by weight | 500 |
| Diisobutylaluminum hydride [1] (DBAH), mmoles | 184 |
| Temperature, °C. | 140–160 |
| Time, hours | 2 |

[1] In 239 ml. toluene.

Butadiene was polymerized in a series of runs using a catalyst formed on mixing the isoprene-diisobutylaluminum hydride reaction product, iodine, and titanium tetrachloride. Aliquots of the isoprene-diisobutylaluminum hydride reaction product were employed, the amount utilized being based on the aluminum charged. Control runs were made using a catalyst formed on mixing triisobutylaluminum, iodine, and titanium tetrachloride. The recipes were the same as given in Example I except that the isoprene-diisobutylaluminum hydride reaction product (MBD-DBAH) was used instead of the reaction product of butadiene and triisobutylaluminum. In each of the runs toluene was charged first after which the reactor was purged with nitrogen. Butadiene was added, then the isoprene-diisobutylaluminum hydride reaction product or the triisobutylaluminum, iodine, and finally titanium tetrachloride. Results are presented in the following table:

| Run No. | MBD-DBAH, g. atoms Al [1] | TBA, mhm. | Al/Ti mole ratio | Conversion, percent | ML-4 at 212° F. | Cold flow, mg./min. |
|---|---|---|---|---|---|---|
| 1 | 2.4 | | 5.3/1 | 23 | (²) | 0.6 |
| 2 | 2.6 | | 5.8/1 | 36 | (²) | 0.9 |
| 3 | 2.8 | | 6.2/1 | 42 | 69 | 1.8 |
| 4 | 3.2 | | 7.1/1 | 39 | 75 | 1.5 |
| 5 | 3.6 | | 8/1 | 50 | 42 | 3.1 |
| 6 | | 2.4 | 5.3/1 | 69 | 21 | 30 |
| 7 | | 2.8 | 6.2/1 | 56 | 10 | 60 |

[1] Based on DBAH component charged when preparing the MBD DBAH reaction product.
[2] Not determined.

In the above examples, Mooney viscosity was determined by ASTM Method D-297-55T.

Cold flow was measured by extruding the rubber through a ¼-inch orifice at 3.5 p.s.i. pressure and a temperature of 50° C. (122° F.). After allowing 10 minutes to reach steady state, the rate of extrusion was measured and the values reported in milligrams per minute.

Inherent viscosity was determined as follows: One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

The microstructure of the polymers was determined by infrared analysis using a commercial infrared spectrometer. The polymers were dissolved in carbon disulfide to form solutions having 25 grams of polymer per liter of solution. The infrared spectrum of such a solution (percent transmisson) is then determined in a commercial infrared spectrometer. The percent of the total unsaturation present as trans 1,4- is calculated according to the following equation and consistent units: $\epsilon = E/tc$, where ϵ=extinction coefficient (liters - mols$^{-1}$ - centimeters$^{-1}$); E=extinction (log $I_0/I$); t=path length (centimeters); and c=concentration (mols double bond/liter). The extinction is determined at the 10.35 micron band and the extinction coefficient used is 146 (liters-mols$^{-1}$-centimeters$^{-1}$). The percent of the total unsaturation present as 1,2- (or vinyl) is calculated according to the above equation, using the 11.0 micron band and an extinction coefficient of 209 (liters-mols$^{-1}$-centimeters$^{-1}$). The percent of the total unsaturation present as cis 1,4- is obtained by subtracting the trans 1,4- and 1,2- (vinyl) determined according to the above methods from the theoretical unsaturation assuming one double bond per each $C_4$ unit in the polymer.

As will be apparent to those skilled in the art from the above description, various modifications can be made in this invention without departing from the spirit or scope thereof.

We claim:

1. A method of polymerizing 1,3-butadiene which comprises contacting 1,3-butadiene under polymerization conditions with a catalyst formed by mixing (1) the reaction product of a conjugated diene selected from the group consisting of butadiene and isoprene with aluminum compounds selected from the group consisting of lithium aluminum hydride and organoaluminum compounds having the formula $R_nAlH_m$, wherein R is a radical selected from the group consisting of saturated aliphatic, saturated cycloaliphatic and aromatic radicals having from 1 to 20 carbon atoms, n is an integer of 1 to 3 and m is an integer of 0 to 2 while the sum of n plus m equals 3, said reaction product being formed by reacting from 2 to 20 mols of said conjugated diene per mol of said aluminum compound for sufficient time for the reaction to proceed to substantial completion and (2) a second component containing iodine and titanium.

2. A method of forming a high cis-polybutadiene which comprises contacting 1,3-butadiene under polymerization conditions in an inert hydrocarbon diluent with a catalyst system formed by mixing (1) a first component which is the reaction product prepared by reacting a conjugated diene selected from the group consisting of butadient and isoprene with an aluminum compound selected from the group consisting of lithium aluminum hydride and organoaluminum compounds having the formula $R_nAlH_m$, wherein R is a radical selected from the group consisting of saturated aliphatic, saturated cycloaliphatic and aromatic radicals having from 1 to 20 carbon atoms, n is an integer of 1 to 3 and m is an integer of 0 to 2 while the sum of n plus m equals 3, at a temperature of at least 50° C. and for at least 15 minutes, the quantity of said conjugated diene being 2 to 20 moles per mole of said aluminum compound, and (2) a second component containing titanium and iodine, and recovering a polymer product.

3. A method of forming a high cis-polybutadiene which comprises contacting 1,3-butadiene under polymerization conditions in an inert hydrocarbon diluent with a catalyst system formed by mixing (1) a first component which is the reaction product prepared by reacting 2 to 20 moles per mole of aluminum compound of a conjugated diene selected from the group consisting of butadiene and isoprene with an aluminum compound selected from the group consisting of lithium aluminum hydride and organoaluminum compounds having the formula $R_nAlH_m$, wherein R is a radical selected from the group consisting of saturated aliphatic, saturated cycloaliphatic and aromatic radicals having from 1 to 20 carbon atoms and n is an integer of 1 to 3 and m is an integer of 0 to 2, at a temperature of about 50 to 250° C. and for 15 minutes to 200 hours, and (2) a second component containing titanium and iodine selected from the group consisting of (a) titanium tetraiodide, (b) titanium tetrachloride and titanium tetraiodide, (c) a titanium halide having the formula $TiX_a$, wherein X is selected from the group consisting of chlorine and bromine and a is an integer of 2 to 4 and an iodine constituent selected from the group consisting of elemental iodine, inorganic iodide, iodohydrocarbon, and an organoaluminum iodide having the formula $R_xAl_yI_z$, where R is as previously defined, x and z are integers of 1 to 3, y is an integer of 1 to 2 and x plus z equals 3 times y, and recovering a polymer product.

4. The method of claim 3 wherein said aluminum compound is triisobutylaluminum and said conjugated diene is butadiene.

5. The method of claim 3 wherein said aluminum compound is triethylaluminum and said conjugated diene is isoprene.

6. The method of claim 4 wherein said second component is titanium tetrachloride and iodine.

7. The method of claim 4 wherein said second component is titanium tetrachloride and titanium tetraiodide.

8. The method of claim 3 wherein said conjugated diene is isoprene and said second component is an organoaluminum iodide and titanium tetrachloride.

9. The polymerization catalyst which forms on mixing (1) the reaction product of a conjugated diene selected from the group consisting of butadiene and isoprene with aluminum compounds selected from the group consisting of lithium aluminum hydride and organoaluminum compounds having the formula $R_nAlH_m$, wherein R is a radical selected from the group consisting of saturated aliphatic, saturated cycloaliphatic and aromatic radicals having from 1 to 20 carbon atoms, n is an integer of 1 to 3, m is an integer of 0 to 2, and n plus m equals 3, said reaction product being formed by contacting said conjugated diene with said aluminum compound at a temperature of at least 50° C. for at least 15 minutes, and (2) a second component containing iodine and titanium.

10. The catalyst composition formed by mixing (1) a first component which is the reaction product prepared by reacting 2 to 20 moles per mole of aluminum compound of a conjugated diene selected from the group consisting of butadiene and isoprene with an aluminum compound selected from the group consisting of lithium aluminum hydride and organoaluminum compounds having the formula $R_nAlH_m$, wherein R is a radical selected from the group consisting of saturated aliphatic, saturated cycloaliphatic and aromatic radicals having from 1 to 20 carbon atoms, n is an integer of 1 to 3, m is an integer of 0 to 2, and n plus m equals 3, at a temperature of about 50 to 250° C. and for 15 minutes to 200 hours, and (2) a second component containing titanium and iodine selected from the group consisting of (a) titanium tetraiodide, (b) titanium tetrachloride and titanium tetraiodide, and (c) a titanium halide having the formula $TiX_a$, wherein X is selected from the group consisting of chlorine and bromine and a is an integer of 2 to 4 and an iodine constituent selected from the group consisting of elemental iodine, an inorganic iodide, an iodohydrocarbon, and an organoaluminum iodide having the formula $R_xAl_yI_z$, where R is as previously defined, x and z are integers of 1 to 3, y is an integer of 1 to 2 and x plus z equals 3 times y.

11. The catalyst of claim 10 wherein said aluminum compound is triisobutylaluminum, said conjugated diene is butadiene, and said second component is titanium tetrachloride and elemental iodine.

12. The catalyst of claim 10 wherein said aluminum compound is triisobutylaluminum, said conjugated diene is butadiene, and said second component is titanium tetrachloride and titanium tetraiodide.

13. The catalyst of claim 10 wherein the ratio of gram atoms of aluminum in said reaction product to total titanium in the catalyst system is in the range of 3:1 to 30:1.

14. The method of claim 3 wherein the ratio of gram atoms of aluminum in said reaction product to the total titanium in said catalyst system is in the range of 3:1 to 30:1, the mol ratio of the titanium compound to said iodine constituent is in the range of 0.2:1 to 10:1, and from 1 to 20 gram millimoles of said reaction product per 100 grams of 1,3-butadiene to be polymerized is present.

15. The catalyst of claim 10 wherein the ratio of gram atoms of aluminum and said reaction product to the total titanium in said catalyst system is in the range of 3:1 to 30:1 and the mol ratio of the titanium compound to said iodine constituent is in the range of 0.2:1 to 10:1.

References Cited

UNITED STATES PATENTS 3,177,183   4/1965   Naylor et al. _____ 260—94.3

JOSEPH L. SCHOFER, *Primary Examiner.*

M. B. KURTZMAN, *Assistant Examiner.*